US 6,617,961 B1

(12) United States Patent
Janssen et al.

(10) Patent No.: US 6,617,961 B1
(45) Date of Patent: Sep. 9, 2003

(54) SECURITY SYSTEM FOR A VEHICLE AND METHOD OF OPERATING SAME

(75) Inventors: David C. Janssen, Whitefish Bay, WI (US); Henry Wagner, Oostburg, WI (US); Robert Buczkiewicz, West Bend, WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

(21) Appl. No.: 09/440,579

(22) Filed: Nov. 15, 1999

(51) Int. Cl.⁷ .............................................. G05B 19/00
(52) U.S. Cl. ............. 340/5.8; 340/825.69; 340/825.72; 340/825.22; 307/10.1; 341/176
(58) Field of Search .............................. 340/5.8, 825.69, 340/825.72, 825.22; 307/10.1; 341/176

(56) References Cited

U.S. PATENT DOCUMENTS

| | | |
|---|---|---|
| 3,745,569 A | 7/1973 | Works et al. |
| 4,509,093 A | 4/1985 | Stellberger |
| 4,595,902 A | 6/1986 | Proske et al. |
| 4,670,746 A | 6/1987 | Taniguchi et al. |
| 4,719,460 A | 1/1988 | Takeuchi et al. |
| 4,738,334 A | 4/1988 | Weishaupt |
| 4,827,744 A | 5/1989 | Namazue et al. |
| 4,898,010 A | 2/1990 | Futami et al. |
| 4,940,964 A | 7/1990 | Dao |
| 4,942,393 A | 7/1990 | Waraksa et al. |
| 5,245,346 A | 9/1993 | Nishimura et al. |
| 5,287,113 A | 2/1994 | Meier |
| 5,377,270 A | 12/1994 | Koopman, Jr. et al. |
| 5,406,270 A | 4/1995 | Van Lente |
| 5,561,420 A | 10/1996 | Kleefeldt et al. |
| 5,619,191 A | 4/1997 | Lambropoulos et al. |
| 5,635,923 A | 6/1997 | Steele et al. |
| 5,682,135 A | 10/1997 | Labonde |
| 5,723,911 A | 3/1998 | Glehr |
| 5,736,935 A | 4/1998 | Lambropoulos |
| 5,745,035 A | 4/1998 | Deyo |
| 5,751,073 A | 5/1998 | Ross |
| 5,774,060 A | 6/1998 | Ostermann et al. |
| 5,774,064 A | 6/1998 | Lambropoulos et al. |
| 5,781,106 A | 7/1998 | Liger |
| 5,790,043 A | 8/1998 | Hettich et al. |
| 5,844,470 A | * 12/1998 | Garnault et al. ............ 340/426 |
| 5,850,188 A | 12/1998 | Doyle et al. |
| 5,864,297 A | 1/1999 | Sollestre et al. |
| RE36,181 E | 4/1999 | Koopman, Jr. et al. |
| 5,898,230 A | 4/1999 | Bartel et al. |
| 5,907,287 A | 5/1999 | Sakagami et al. |
| 5,912,631 A | 6/1999 | Kusunoki |
| 5,923,758 A | 7/1999 | Khamharn et al. |
| 5,929,769 A | 7/1999 | Garnault |
| 5,973,611 A | 10/1999 | Kulha et al. |

FOREIGN PATENT DOCUMENTS

| | | |
|---|---|---|
| DE | 2324392 | 12/1974 |
| DE | 2824421 | 12/1979 |
| DE | 2926304 A1 | 1/1981 |
| DE | 3313098 C1 | 10/1984 |
| EP | 0 219 060 A2 | 4/1987 |

* cited by examiner

Primary Examiner—Michael Horabik
Assistant Examiner—M. Shimizu
(74) Attorney, Agent, or Firm—Michael Best & Friedrich LLP

(57) ABSTRACT

A security system for a vehicle comprising a frame and a combination remote keyless entry and passive security system including at least one antenna mounted on the frame.

27 Claims, 5 Drawing Sheets

SECURITY SYSTEM FOR A VEHICLE AND METHOD OF OPERATING SAME

BACKGROUND OF THE INVENTION

The invention relates to an entry and security system installed on a vehicle, and particularly, to a combination passive security and remote entry security system capable of changing the state of a latch mechanism mounted on a vehicle from a secured state to an unsecured state.

Various systems and methods for providing a signal to unlock a vehicle door have been presented in the prior art. One such system is a Remote Keyless Entry (RKE) system. The RKE system of the prior art includes a portable transmitter, or fob, that transmits a signal to an antenna mounted on a vehicle in response to a user request. The signal causes a vehicle controller to move a lock mechanism mounted on the vehicle frame from a secured (or locked) state to an unsecured (or unlocked) state or vice versa. The fob of the RKE system typically includes one or more buttons for initiating various actions (e.g., locking or unlocking doors to the vehicle or to the trunk of the vehicle or initiating a "panic" alarm) when a user depresses one of the buttons.

Another prior system for providing a signal for unlocking a vehicle door is a Passive Security (PS) system. The PS system of the prior art includes a fob that transmits a signal requesting a vehicle controller to change the state of the latch mechanism mounted on the vehicle frame from a secured state to an unsecured state. The initiation of the signal occurs when the fob is adjacent to the vehicle.

Yet another prior system for providing a signal for unlocking a vehicle door is a Modified Passive Security (MPS) system. The MPS System of the prior art is similar to the PS system except that the initiation of the signal requesting the lock mechanism to move from an unsecured state to a secured state occurs when a user actuates a door handle on the vehicle frame.

SUMMARY OF THE INVENTION

Accordingly, the invention provides a Vehicle Security (VS) System having generally at least one antenna, a controller and at least one fob. The VS system is adapted to be mounted on a vehicle having a frame. The frame has at least one enclosure (i.e., door) movable between open and closed positions. Each enclosure has a latch mechanism for securing the door in the closed position. The securing of the door prevents unauthorized or inadvertent movement of the door to the open position.

Each antenna of the VS system is mounted on the vehicle frame, and transmits and receives communication signals with the fobs. The controller is mounted on the frame and is electrically connected to each of the antennas and each of the latch mechanisms. The controller provides a signal to the latch mechanisms capable of moving the latch mechanism from the secured state to the unsecured state or vice-versa.

In one embodiment of the invention, each of the fobs transmit either an RKE signal or a PS signal to the controller through the vehicle antennas. The RKE signal is transmitted when the user depresses a button on one of the fobs requesting the latch mechanisms to be in the secured or unsecured state. The PS signal is transmitted when one of the fobs is within a radiation pattern emitted by one of the antennas. The radiation pattern can be continuously radiated by the antenna or be initiated when a user attempts entry to the vehicle. Thus, the VS system allows for the benefits of both RKE systems and PS systems.

In another embodiment of the invention, more than one antenna may be mounted on the vehicle allowing a user to unlock only a specific door while attempting to enter the vehicle. For example, if the vehicle has two doors, the driver side door could "unlock" while the user approaches or attempts to enter that door while carrying a fob. Similarly, the passenger side door could "unlock" while the user approaches or attempts to enter that door while carrying a fob. In the alternative, the VS system allows the user the flexibility of "unlocking" of all of the doors if the user approaches or attempts to enter any of the vehicle doors while carrying a fob.

In yet another embodiment of the invention, the PS signal allowing communication between the vehicle and the fobs is generated only when one of the fobs is within the vicinity of one of the vehicle doors. That is, each of the radiation patterns emitted by the antennas is a unidirectional radiation pattern, and the fobs will provide PS signals for unlocking the vehicle door only if they are within one of the unidirectional radiation patterns. Preferably, the unidirectional radiation patterns are transmitted such that they are directly adjacent to the vehicle's enclosures.

Additionally, the VS system includes an improved encryption method for establishing secured communications between the antennas and the fobs. Specifically, the vehicle controller has a key or key code (which is stored in both the fob and the vehicle controller). The vehicle controller uses the key to form a challenge signal by "combining" a random number with a challenge data packet that includes challenge data. The vehicle controller then transmits the challenge signal. The vehicle controller generates an expected number from the random number. At about the same time, the fob receives the challenge signal from the vehicle antenna and "separates" the random number from the challenge data packet. The fob generates an answer using the key and the random number, and then the fob generates a response signal by using the key to "combine" the answer with a response data packet including response data. The fob then transmits the response signal to the vehicle.

The vehicle controller receives the response signal from the fob and "separates" the answer from the response data packet. If the two numbers (i.e., the answer and the stored or "expected" number) are the same, the vehicle controller provides a signal changing the state of the vehicle to an "unlocked" state. If more than one user with a fob is attempting to enter the vehicle at the same time, the vehicle entry system will give priority to one fob over another fob to prevent conflicting actions from being initiated by different fobs.

Furthermore, the invention provides a VS system that initiates three steps of validation when a fob is attempting to passively unlock a vehicle door. First, the fob verifies that a received challenge signal has the proper signal strength in order to ensure that the signal detected by the fob is not simply noise and that the fob is within the radiation pattern of the antenna. In other words, if the fob is not within a predetermined distance of the antenna, the strength of the signal radiating from the antenna will be too weak for the fob to continue. Throughout this period, the microprocessor in the fob is in a "sleep mode." Next, the fob provides bit-check verification of the challenge signal to make sure that the signal received from the antenna is proper for the VS system incorporating the invention. That is, the fob calculates the time between segments of challenge data to determine if the timing is proper for the VS system. The fob will not transmit a response signal unless the interrupt time is correct. Lastly, the vehicle entry system proceeds through data packet validation. Data packet validation is the process whereby the system determines if the fob has the same vehicle code as the stored vehicle code. By going through a three-step process, the fob consumes less power since it does not attempt to signal a vehicle door based on a false input signal.

The invention also provides for a distributive VS system to be mounted in a vehicle having a frame. The system includes at least two antennas each having a respective radiation pattern. The first antenna is adapted to be mounted on the frame in a first position and the second antenna is adapted to be mounted on the frame in a second position spaced from the first position so as to prevent the first and second radiation patterns from interfering with one another. The radiation patterns can be unidirectional radiation patterns, and the system includes at least one fob configured to remotely communicate with each of the antennas. The first fob communicates with the first antenna when it is within the first radiation pattern and communicates with the second antenna when it is within the second radiation pattern.

The frame includes at least one enclosure (e.g., vehicle door) mounted on the frame with each enclosure having a latch mechanism. Each vehicle door includes an actuating device (e.g., door handle). The latch mechanism can be switched between a secured and an unsecured state. In the secured state, the latch mechanism prevents unauthorized or inadvertent operation of the actuating device to open the enclosure. The first latch mechanism is associated with the first antenna such that the latch mechanism moves between the secured and unsecured state when the fob is within the first radiation pattern. The second latch mechanism is associated with the second antenna such that the latch mechanism moves between the secured and unsecured state when the fob is within the second radiation pattern. In one embodiment of the invention, the fob initiates communication with one of the vehicle antennas only after being challenged by the vehicle when a user actuates the actuating device on the vehicle. In a second embodiment, the fob initiates communication with one of the vehicle antennas when a user, holding a fob, enters the radiation pattern of the vehicle antenna.

The fob of the VS system also includes a remote keyless entry (RKE) control for generating a first RKE signal between the fob and at least one of the vehicle's antennas to move the latch mechanisms from the secured state to the unsecured state. Additionally, the RKE control generates a second RKE signal from the fob to at least one of the antennas to move the latch mechanisms from the unsecured state to the secured state.

The invention also provides a VS system in which the fob communicates with one of the vehicle antennas to move the latch mechanism from a locked state to an unlocked state in a three-step process. First, the fob verifies that a received signal has the proper amplitude and frequency to be a challenge signal from the vehicle antenna. Second, the fob verifies that the challenge signal has a proper timing to be a challenge signal from the vehicle antenna. If the challenge signal has the proper amplitude and timing or time frame, the VS system proceeds through data packet validation.

The data validation process includes transmitting a challenge signal including a challenge data packet from the vehicle antenna to a first fob antenna. In response to receiving the challenge data packet, the fob authenticates the challenge data packet. If the authentication of the challenge data packet has been met, the fob generates a response signal including a response data packet. The response signal is transmitted from the first fob antenna to the vehicle antenna. In response to receiving the challenge data packet, the vehicle controller authenticates the response data packet. The latch mechanism changes from the secured state to the unsecured state if the response data packet has been authenticated. The two authentication acts will only be met if the vehicle electronic key code and the fob electronic key code are the same.

The invention also provides a VS system wherein, if there is more than one fob within the radiation patterns, a first fob will take priority over the remaining fobs. That is, the first fob will proceed in attempting to change the state of the latch mechanism from the secured state to the unsecured state by using the three step process above, and a second fob will also attempt to unlock the vehicle door by also following the three-step process above. However, the second fob will not transmit the response signal until a time period has elapsed which is sufficient to allow the first fob to respond. In other words, only one fob at a time will respond. This ensures that the transmitted signal will not be either distorted or incorrect due to more than one fob engaging in communication within the radiation patterns of the antennas at the same time.

It is an advantage of the invention to combine a PS system with a RKE system. The combination PS system and RKE system allows for the benefits of each system. More specifically, the invention can remotely secure or unsecure a vehicle and passively unsecure a vehicle with the same fob.

It is another advantage of the invention to provide more than one antenna in the VS system. Providing more than one antenna reduces power consumption within the fob and the vehicle, reduces unexpected vehicle unlocking, and allows for the fob to initiate a PS signal to any specific vehicle enclosure upon approaching or attempting to enter that enclosure.

It is another advantage of the invention to have a VS system with an antenna providing unidirectional PS radiation patterns. This allows the VS system to unlock an enclosure when the fob is within a certain area in relation to the vehicle. For example, as the user with a valid fob is nearby the driver side door, the driver side door will unlock. However, continuing the example, the door will not unlock when the user is near the front of the car.

It is another advantage of the invention to allow more than one fob to be used with the VS system without having the fobs conflict.

It is another advantage of the invention to use a three-step process to validate data received by the fob. This will prevent the fob from consuming power while trying to unlock a vehicle based on false signals.

Figure 1:
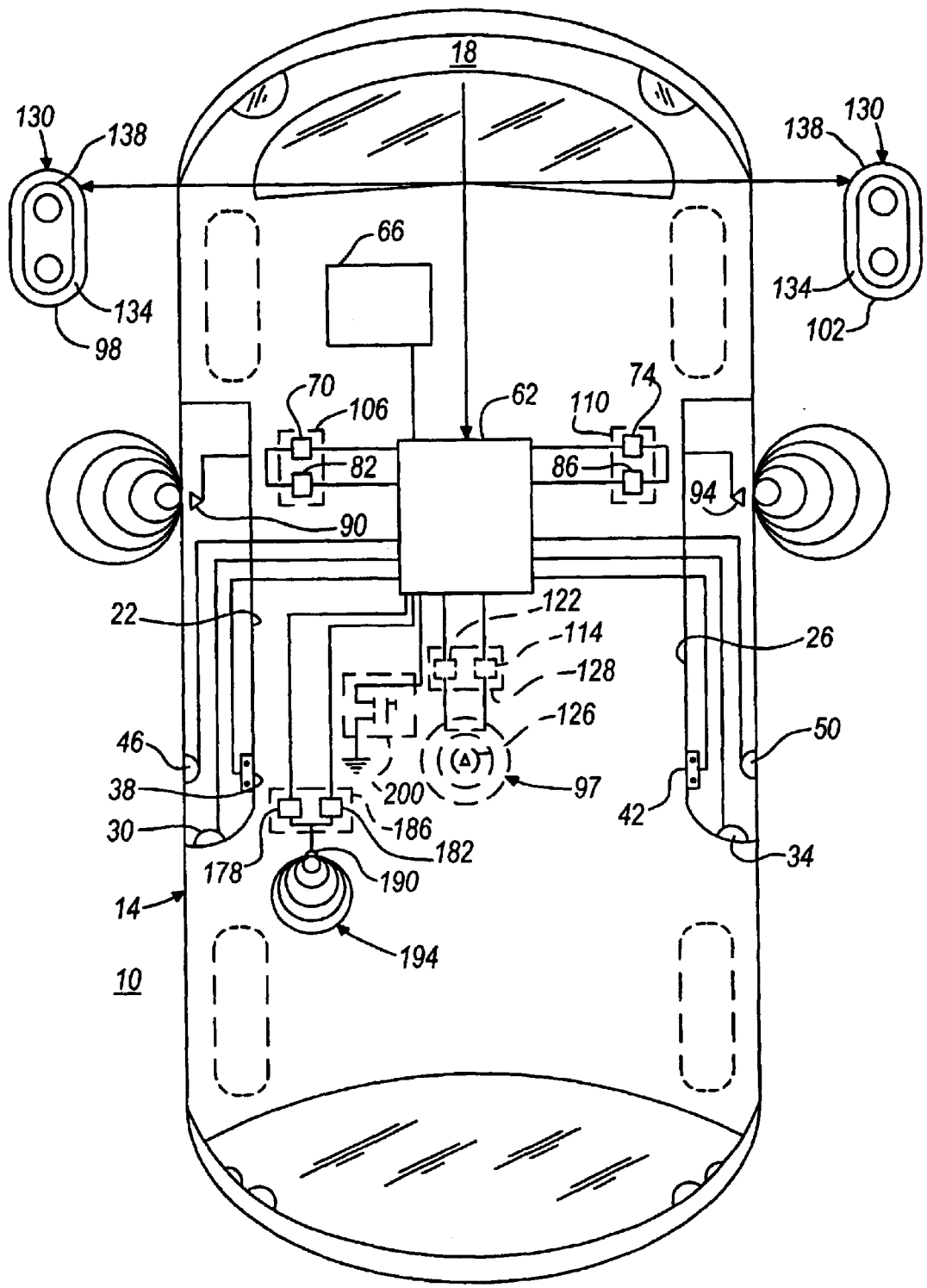
FIG. 1 is a perspective view of a vehicle security system embodying the invention.

Before one embodiment of the invention is explained in full detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
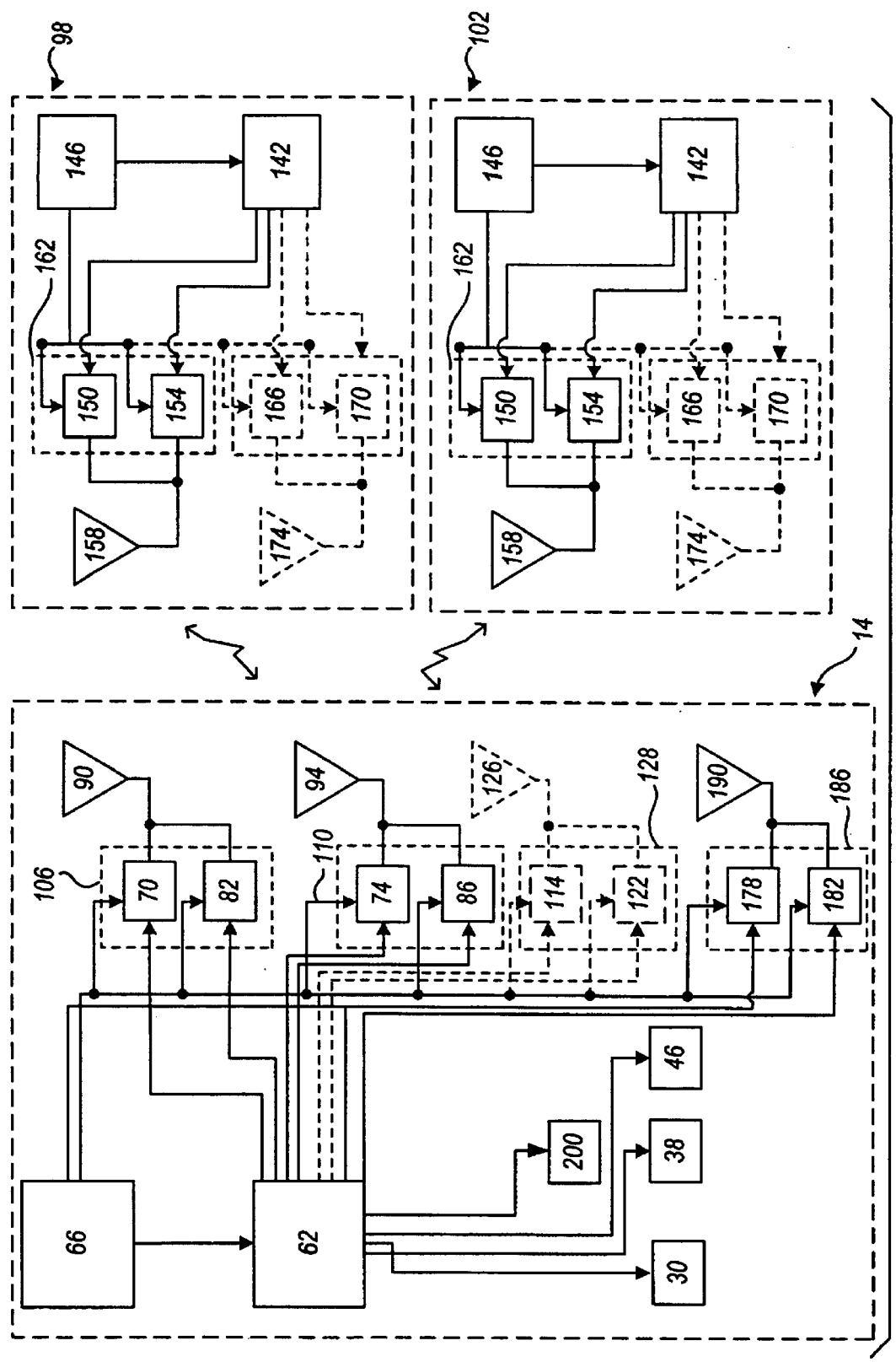
FIG. 2 is a schematic view of the vehicle security system embodying the invention.

Shown in FIG. 1 of the drawings is a vehicle 10 embodying the invention. The vehicle has a frame 14. As shown in FIGS. 1 and 2, the frame 14 includes two vehicle doors 22 and 26 mounted on the frame 14 for movement between open and closed positions, and two latch mechanisms 30 and 34 mounted in the vehicle doors 22 and 26, respectively. The latch mechanism of the preferred embodiment is shown and described in U.S. patent application Ser. No. 09/408,993, entitled Modular Latch Apparatus and Method which was filed on Sep. 29, 1999 and which is incorporated herein by reference. Each latch mechanism 30 and 34 includes a latch (not shown) moveable between a secured or locked state, preventing unauthorized or inadvertent opening of the respective vehicle door 22 and 26, and an unsecured or unlocked state, allowing opening of the respective vehicle door 22 and 26. The vehicle doors 22 and 26 may be enclosures to the vehicle for a user (e.g., driver or passenger side doors) or may be enclosures for a vehicle storage compartment (not shown) such as a trunk or glove compartment. The vehicle 14 also includes a vehicle security (VS) system 18. The VS system 18 includes two user operable locking devices 38 and 42, and two actuating devices 46 and 50 (e.g., door handles or discrete switches (not shown) or other electronic actuators mounted separately on or in the doors) all mounted on the frame 14. Of course, the type of vehicle 14 (e.g., car, van, truck, etc.), the number of vehicle doors 22 and 26 and the number of latch mechanisms 30 and 34 could vary without parting from the spirit of the invention.

As is commonly known in the art, the door handles 46 and 50 allow a user (not shown) to open the vehicle doors 22 and 26 when the respective latch mechanisms 30 and 34 are in the unsecured (unlocked) state. This occurs when the user actuates the actuating device 46 and 50 while the latch is unlocked.

The user operable locking devices 38 and 42 allow a user inside the vehicle 10 to manually change the associated latch from the unlocked state to the locked state, or vise-versa. As shown in FIG. 1, the user operable devices are electronically controlled push buttons 38 and 42 mounted on the respective vehicle door 22 and 26 for locking and unlocking the vehicle. Upon depressing the first push button, the respective latch will move from the unlocked state to the locked state, and upon depressing the second push button, the respective latch will move from the locked state to the unlocked state. Alternatively, the user operable locking device 38 and 42 could be configured to lock and unlock all of the latches at the same time. In other embodiments (not shown), other styles of user operable locking devices could be used. For example, the user operable locking device 38 and 42 could be a manually operated lock lever (not shown) mounted on the vehicle door.

As shown schematically in FIGS. 1 and 2, the VS system 18 includes a vehicle controller 62, connected to latch mechanisms 30 and 34, to user operable locking devices 38 and 42 and to door handles 46 and 50. The vehicle controller 62 includes a microprocessor (not shown) having static and dynamic memory. The static memory of the microprocessor preferably includes programmable read only memory storing program logic, a vehicle identification (VID)) number (nearly unique to the vehicle controller), a vehicle random number generator and a vehicle electronic key code. The static memory of the microprocessor also preferably includes eight stored fob identification (FID) numbers. This number may vary depending upon the circumstances.

The VS system 18 also includes a vehicle power source 66 for supplying power to the VS system. The vehicle power source 66, as shown in FIG. 1 and FIG. 2, is preferably a typical 12-volt vehicle battery. Furthermore, the vehicle power source 66 is electrically connected to each of the latch mechanisms 30 and 34. In other embodiments (not shown), other power sources 66 could be used for the VS system 18.

The VS system 18 further includes two vehicle passive security (PS) transmitters 70 and 74, and two vehicle PS receivers 82 and 86, all mounted on the vehicle 10 in electrical communication with vehicle controller 62. In one embodiment, PS transmitters 70 and 74 are combined with PS receivers 82 and 86, respectively into unitary PS transceivers 106 and 110, respectively. In the preferred embodiment, the vehicle unitary PS transceiver 106 and 110 is preferably an RF Monolithics TR3001 ASH transceiver. Of course, other discrete transmitters, receivers or unitary transceivers could be used.

As shown in FIGS. 1 and 2, the VS system further includes two vehicle PS unidirectional antennas 90 and 94 both mounted on the vehicle 10 in electrical communication with the PS transceivers 106 and 110, respectively. As shown in FIG. 1, each of the vehicle PS antennas 90 and 94 generates a respective unidirectional or regionalized PS radiation pattern 95 and 96 for sending and receiving radio frequency (RF) signals to and from a transceiver within the radiation pattern. The PS radiation patterns 95 and 96 can be of any range, but preferably extend approximately 2 meters from the respective PS vehicle antennas 90 and 94 in a direction outward from the vehicle 10, and are configured so that the various PS radiation patterns 95 and 96 generated do not overlap with each other. Moreover, each of the PS vehicle antennas 90 and 94 can be mounted anywhere within the vehicle 10. Preferably, the vehicle PS antennas 90 and 94 are mounted within the frame 14 to facilitate communications within approximately two meters of the respective vehicle doors 22 and 26. Of course, other embodiments for mounting the antennas may be used.

As shown in phantom in FIGS. 1 and 2, the VS system further includes a vehicle RKE transmitter 114, a vehicle RKE receiver 122 and a vehicle RKE antenna 126 connected to the vehicle controller 62. In one embodiment, the vehicle RKE transmitter 114 and the vehicle RKE receiver 122 are combined to form a vehicle unitary RKE transceiver 128. The vehicle RKE antenna 126 generates an omnidirectional RKE reception pattern 97 for sending and receiving remote communications in any direction within a range of approximately 30 meters from the vehicle 10. In an alternative embodiment (not shown), the PS antennas 90 and 94 can be used in combination for sending and receiving RKE signals as well as PS signals. In this form, the combined unidirectional reception patterns of the PS antennas will form an omnidirectional RKE reception pattern 97 adequate to send and receive remote communications up to approximately 30 meters from the vehicle 10.

As shown in FIG. 1, the VS system includes one or more hand-held fobs 98 and 102 for remotely communicating with the VS system. Except as noted below, the fobs 98 and 102 are identical to each other, and accordingly, only the fob 98 will be described in detail. The fobs include a hand-held housing 130 having a continuous sidewall 134 and a front panel 138 supported by the sidewall 134. The front panel 138 includes a user-entry area having, preferably, at least two entry buttons. The entry buttons may be depressed by a user (not shown). The first entry button allows the user, upon depressing the button, to initiate an RKE signal from the fob 98 to the vehicle 10 requesting the VS system 18 to change at least one of the latches from a secured state to an unsecured state. The second entry button allows the user, upon depressing the button, to initiate an RKE signal from the fob 98 to the vehicle 10 requesting the VS system 18 to change at least one of the latches from an unsecured state to a secured state. Other buttons may be added to the fob 98 to effect other functions. Furthermore, in other embodiments (not shown) the function of the first and second entry buttons could be combined into one button where the states of the latches change each time the user depresses the button. Additionally, it is possible to configure the vehicle controller 62 so that depressing either of the entry buttons on the fob could change the respective state of all of the latches from the secured state to the unsecured state, or vice-versa.

As shown schematically in FIG. 2, each fob 98 includes, mounted within the housing 130 (FIG. 1), a fob controller 142, a fob PS transmitter 150 and a fob PS receiver 154 connected to the fob controller 142, and a fob PS antenna 158 connected to the fob PS transmitter 150 and the fob PS receiver 154. As shown in FIG. 2, the PS transmitter 150 and the PS receiver 154 could be combined into a unitary PS transceiver 162. Preferably, the transceiver 162 is an RF Monolithics TR3001 ASH transceiver. As shown in phantom in FIG. 2, the fob 98 further includes a fob RKE transmitter 166 and a fob RKE receiver 170 connected to the fob controller 142, and a fob RKE antenna 174 connected to the fob RKE transmitter 166 and the fob RKE receiver 170. The fob RKE transmitter 166 and the fob RKE receiver 170 may also be combined to form a fob unitary RKE transceiver 178.

Fob 98 also includes a power source 146 is connected to the fob components to provide power thereto. The fob power source 146 may be a battery, or alternatively, a coil tuned to the transmitting frequency of the vehicle PS transmitters 70 and 74 to generate power on receipt of a signal therefrom.

The fob controller 142 includes a microprocessor (not shown). The microprocessor preferably includes static memory and dynamic memory, and is preferably a Microchip PIC 12650X series RISC CPU, although other microprocessors could be used. The static memory of the microprocessor stores program logic for effecting the functions of the VS system, a vehicle identification (VID) number (nearly unique to each vehicle), a fob identification (FID) number (unique to each fob associated with the vehicle), and a key code. The FID number is a serial identification number for the fob. Upon "introducing" the fob to the VS system, the vehicle controller 62 stores the VID number, the FID number, and the key code in the static memory of the fob so that the VS system can identify which fob (e.g., 98 or 102) is communicating with the VS system, and so that both the vehicle controller and the fob are using the same key code during communication.

The VS system also includes a passive vehicle ignition transmitter 178, and a passive vehicle ignition receiver 182 mounted on the vehicle 10 in electrical communication with vehicle controller 62. In one embodiment, the passive vehicle ignition transmitter 178 is combined with the passive vehicle ignition receiver 182 into a unitary passive vehicle ignition transceiver 186. In the preferred embodiment, the passive vehicle ignition transceiver 186 is preferably an RF Monolithics TR3001 ASH transceiver. Of course, other discrete transmitters, receivers or unitary transceivers could be used. A passive vehicle ignition antenna 190 is connected to the passive vehicle ignition transceiver 186. The passive vehicle ignition antenna 190 is preferably a unidirectional antenna that generates a unidirectional radiation pattern 194 having a limited range of approximately one meter. Though not depicted in FIG. 1, the passive vehicle ignition antenna 190 and transceiver 186 are preferably mounted adjacent the driver's seat (not shown) either in, on or near the dash board so that communication can occur between a fob 98 in the possession of the driver (not shown) who is seated in the driver's seat, and the passive vehicle ignition transceiver 186. However, the actual location of the antenna 190 and transceiver 186 may vary from vehicle to vehicle.

The VS system also 18 includes an ignition switch 200 mounted on the vehicle dashboard. The ignition switch is electrically connected to the vehicle controller so that the driver can initiate communication between the passive vehicle ignition transceiver 186 and the fob 98 merely by pressing the switch 200.

In operation, the operator or user of the vehicle "introduces" or programs at least one fob 98 to communicate with the vehicle controller 62. When introducing the fob 98 to the vehicle controller, the fob microprocessor and vehicle microprocessors are in bidirectional communication. The VID number and the vehicle electronic key code, both stored within the static memory of the vehicle microprocessor, are transmitted and stored within the static memory of the fob microprocessor. The transmitted VID number becomes the stored VID number within the fob microprocessor and the transmitted vehicle electronic key code becomes the fob electronic key code within the fob microprocessor. Similarly, the FID number is transmitted from the vehicle controller to the fob to become the stored FID in the fob.

Additional fobs 102 can be introduced to the vehicle controller at any time. Similar to fob 98, when fob 102 is introduced to the vehicle controller, the VID number, the FID number and the vehicle electronic key code are transferred to the fob microprocessor. Moreover, the stored VID numbers for each respective fob 98 and 102 are the same because there is only one VID number for the vehicle controller. Similarly, the stored fob electronic key codes for each respective fob 98 and 102 are the same because there is only one vehicle electronic key code for the vehicle controller. The method of introduction could be any known method within the art and additional fobs may be added to the system, as the application requires.

Assume for the purposes of this discussion that the vehicle 10 is locked. One method of unlocking the vehicle 10 is to manually insert a metal key (not shown) having a key bitting into a key receptacle (not shown). If the key bitting of the key matches the key receptacle, the user can physically turn the key within the receptacle changing the state of the latch from the locked state to the unlocked state.

A second method for unlocking the vehicle 10 is to depress the first push button on one of the fob user-entry areas 138 resulting in at least one of the latch mechanisms 30 or 34 unlocking. For example, the user depresses the first push button on fob 98 initiating remote communications between the fob 98 and the vehicle controller 62. In the preferred embodiment, the fob microprocessor generates an encrypted data packet. The encrypted data packet is converted into a radio frequency RKE signal conditioned to have the proper amplitude and the proper frequency for the RKE system. The RKE signal is transmitted between the fob RKE antenna 174 and the vehicle RKE antenna 126 (assuming the RKE antenna 126 and is present) if the fob is within the RKE reception pattern 97.

A third method for unlocking the vehicle 10 is to have at least one fob 98 "passively" communicate with the vehicle controller 62. Passive communication between the fob 98 and the controller 62 initiates when the user lifts the door handle 46 to open the door. The vehicle controller 62 detects movement of the door handle and generates a challenge data packet to be transmitted from the vehicle controller 62 to any fob within the respective PS radiation pattern 95.

The challenge data packet, which is a binary number, is formed by "combining" the VID number with a random number generated by the vehicle controller. The method of "combining" the VID number with the first random number can include any type of mathematical or logical operation. For example, the VID number can be multiplied, divided, added or subtracted to the first random number in any combination. In the preferred embodiment, the "combining" operation is a scrambling algorithm such as a placement function. For example, assuming that there are sixteen digits in the data stream and that the VID is a four digit number, a twelve digit random number is generated, and the four digits of the VID are intermingled with the twelve digits of the random number. The algorithm or key dictates where in the sixteen digit data stream the VID digits are placed. As long as the vehicle controller and the fob are programmed with the same algorithm or key, they will be able to communicate by combining and separating the data and the random numbers, respectively.

Because the VS system is "asynchronous," i.e., the microprocessor clocks for the fobs are not synchronized with the microprocessor clock for the vehicle controller 62, the challenge data packet also includes a preamble. The preamble is a series of bits used in part to synchronize communication between the fobs and the vehicle controller 62.

Once the challenge data packet has been generated, it is transformed into an RF-based challenge data signal having the correct amplitude and frequency for the PS system. The signal is transmitted from one of the vehicle PS antennas 90 to the fob 98 while the fob 98 is within the PS radiation pattern 95.

The fob PS controller 142 and transceiver 162 are normally in a sleep mode. After a defined period of time, the fob PS transceiver 162 is enabled for a short period of time. Once enabled, the fob PS transceiver 162 checks for any possible PS signals received at the fob PS antenna 158. If the fob PS transceiver 162 does not receive any possible PS signals it goes back to sleep. This process is called "polling". In other embodiments, the fob PS transceiver 162 is normally "on" and set to receive an RF transmission at any time.

During polling, the fob PS transceiver 162 checks for an interrupt provided by a detected signal, presumably a data bit from the preamble of the challenge data. When the fob 98 receives a signal, the fob 98 executes a three-step validation process to distinguish between or "filter" unwanted noise or invalid PS signals from valid PS signals. The first step of the validation process is signal strength analysis. The received signal is processed through a narrow bandwidth filter and is attenuated by a programmable threshold resistor within the fob PS transceiver 162. The frequency, amplitude and modulation of a challenge signal generated while the fob 98 is within the radiation pattern is such that it will be processed through the narrow bandwidth filter. This causes the transceiver 162 to generate an interrupt to "wake" or activate the controller 142 from the sleep mode. "False" signals or noise will not pass through the filter, and will not falsely activate the fob controller 142.

During signal strength analysis, the fob microprocessor is continuously in sleep mode. Therefore, all relevant functions of signal strength analysis need to be implemented by a control device (not shown) such as a RC circuit or a crystal clocked flip-flop within the fob PS transceiver 162. Only when a possible PS signal is detected does the fob PS transceiver 162 remain active and transfer the data to the connected fob microprocessor.

After a predetermined start-up delay of approximately 300 microseconds, the fob microprocessor begins a second level of validation by performing a bit by bit analysis of the incoming data stream from the transceiver 162. As was disclosed above, the challenge data packet of the challenge data signal contains a preamble of data bits. The first few bits analyzed by the fob microprocessor are checked to determine if they match a predetermined or expected timing for the PS system. If the preamble bits do not match the timing expected by the microprocessor, the microprocessor goes back to sleep mode and communication is terminated. If, on the other hand, the preamble bits match the timing expected by the microprocessor, the microprocessor will continue to the third level of validation.

The third and last level of validation within the fob 98 is actual data packet validation. Conventional oversampling data detection and validation routines are used to extract the clock and decode the data from the data packet. First, the remaining portion of the preamble is used to sufficiently reconstruct the clock for the fob microprocessor. Stated differently, the challenge data packet preamble allows the fob microprocessor to synchronize with the incoming challenge signal data packet to provide proper sampling. Once the fob microprocessor is synchronized, the challenge signal is sampled and stored within the microprocessor for analysis and authentication.

Once stored, the challenge data is then "separated" from the random number by the fob microprocessor. The resulting VID number is compared with the stored VID number within the fob microprocessor. If the two VID numbers are equal, the fob proceeds to generate a response signal having a response data packet. If the two VID numbers are not equal, the fob does not respond and the fob microprocessor goes back to sleep mode.

The response data packet, which is a binary number, is formed by "combining" the key with the received random number. During this time, the vehicle PS transceiver 106 and the vehicle microprocessor are waiting for a response signal from the fob. However, if no signal is received within a predetermined time period, the vehicle microprocessor will go back to its initial state of either waiting for a user to actuate the actuating device or periodically providing challenge signals.

The received signal is first analyzed by the vehicle controller to determine if the signal is a possible response signal from the fob. For example, the received signal is analyzed to determine if it has the correct amplitude, frequency and modulation to be a possible response signal originating from the fob. If so, the preamble of the response signal synchronizes the vehicle microprocessor to the received signal and the response signal is sampled to obtain the response data packet.

Once the response data packet is obtained, it is analyzed for authentication. Similar to the fob microprocessor, the vehicle microprocessor "separates" the response data from the response data packet.

After the vehicle microprocessor obtains the resulting number from the response data packet, it is compared with the expected number within the vehicle microprocessor. If the two numbers are equal, then the vehicle controller will provide a signal to the respective latch mechanism 30 changing the associated latch to become unlocked. If the resulting number is different than the expected number, then the vehicle controller 62 will do nothing. Alternatively, if the two numbers are equal, the vehicle controller may provide a signal to all of the latch mechanisms 30 and 34 changing the respective latches from the secured state to the unsecured state.

To prevent interference between each of the fob expected responses, each fob 98 and 102 preferably initiates a transmission of the response signal at a different time period. For example, two "valid" fobs 98 and 102 may be in the PS radiation pattern 95 at the same time. Each valid fob 98 and 102 receives the challenge signal from the vehicle PS antenna 90 and generates a respective response signal (assuming the challenge signal meets the three-step validation process). To prevent confusion at the vehicle microprocessor, the second fob 102 transmits its response signal a predetermined amount of time after the first fob 98 transmits its response signal. The time period between transmission of the first and second response signals will be sufficiently long enough to allow the first response signal adequate time to begin transmission.

The amount of time a particular fob 98 waits is determined when the fob 98 and the vehicle controller 62 coordinate key codes and identification numbers. The first fob 98 to be introduced is programmed to provide the response signal right after generation of the response data packet. The second fob 102 to be coordinated will be programmed to provide signals at a first predetermined time period after generation of its response data packet. Other fobs (not shown) will be programmed accordingly.

The vehicle doors are locked using a variety of methods. First, a driver or passenger in the vehicle 10 can actuate the devices 38 or 42 to lock the doors. Secondly, the driver or passenger can depress a push button on the user-entry area 138 of the fob to effect an RKE command that locks the door or doors. Alternatively, when leaving the vehicle, the driver or passenger may initiate passive communication between the fob and the vehicle to effect locking of the doors. This could be done by lifting the door handle or actuating the other electronic actuator when leaving the car. In this embodiment, the VS system 18 would be programmed to remember the state of the latches (or alternatively, includes a state switch that holds the actual state of the latch), and change the state upon each successful passive communication with the fob.

When the driver has entered the vehicle and desires to turn the engine on, he presses the button ignition switch 200 mounted on the vehicle dash board. Depressing the ignition switch 200 has a similar effect as lifting the door handles 46, i.e., communication is initiated between the fob 98 and the vehicle controller 62. However, the end result is to start the engine rather than unlock the vehicle door. The engine can be turned "off" simply by depressing the ignition switch 200 a second time.

Figure 3A:
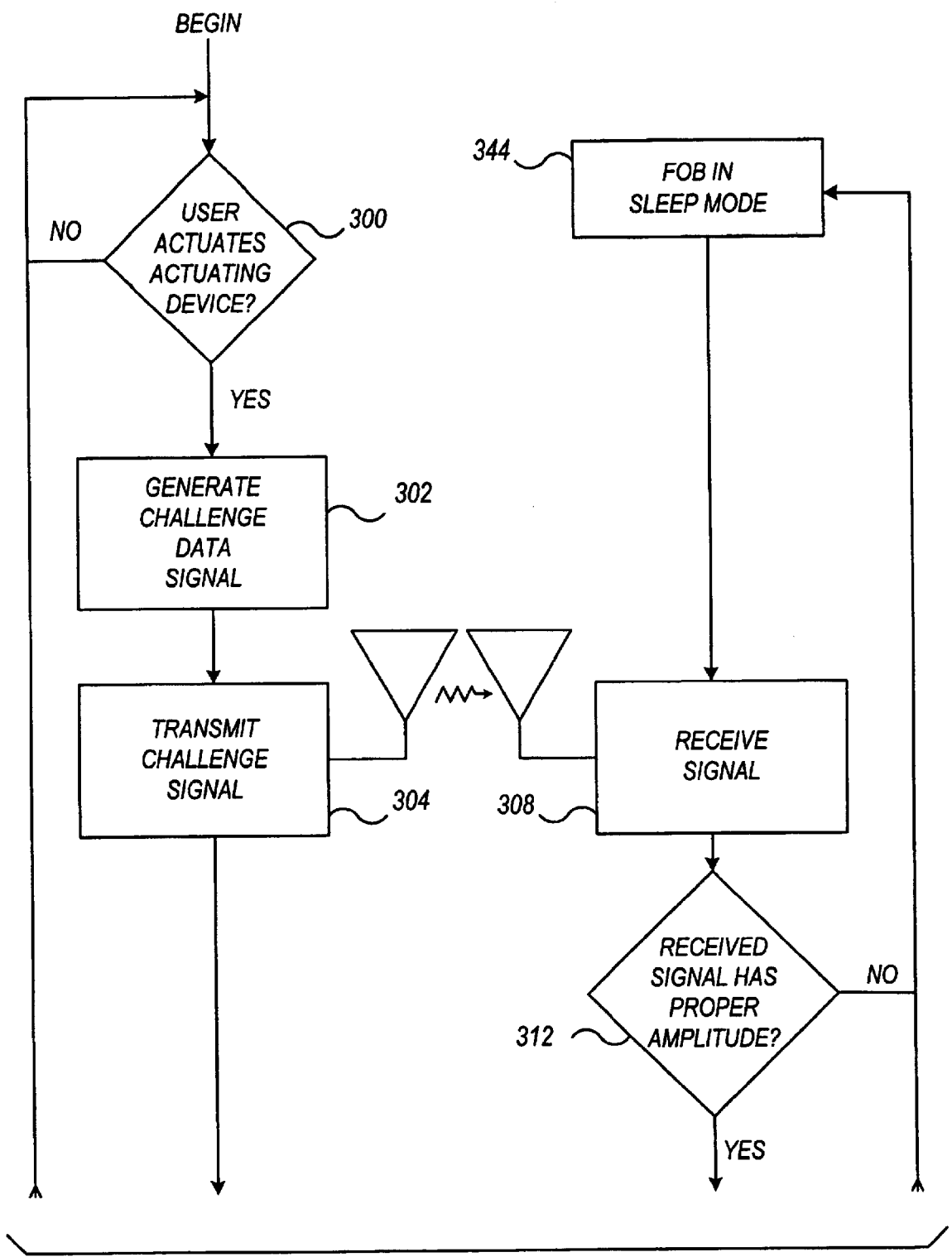
FIGS. 3a, 3b, and 3c are flowcharts of a vehicle controller in passive communication with a fob.
Figure 3B:
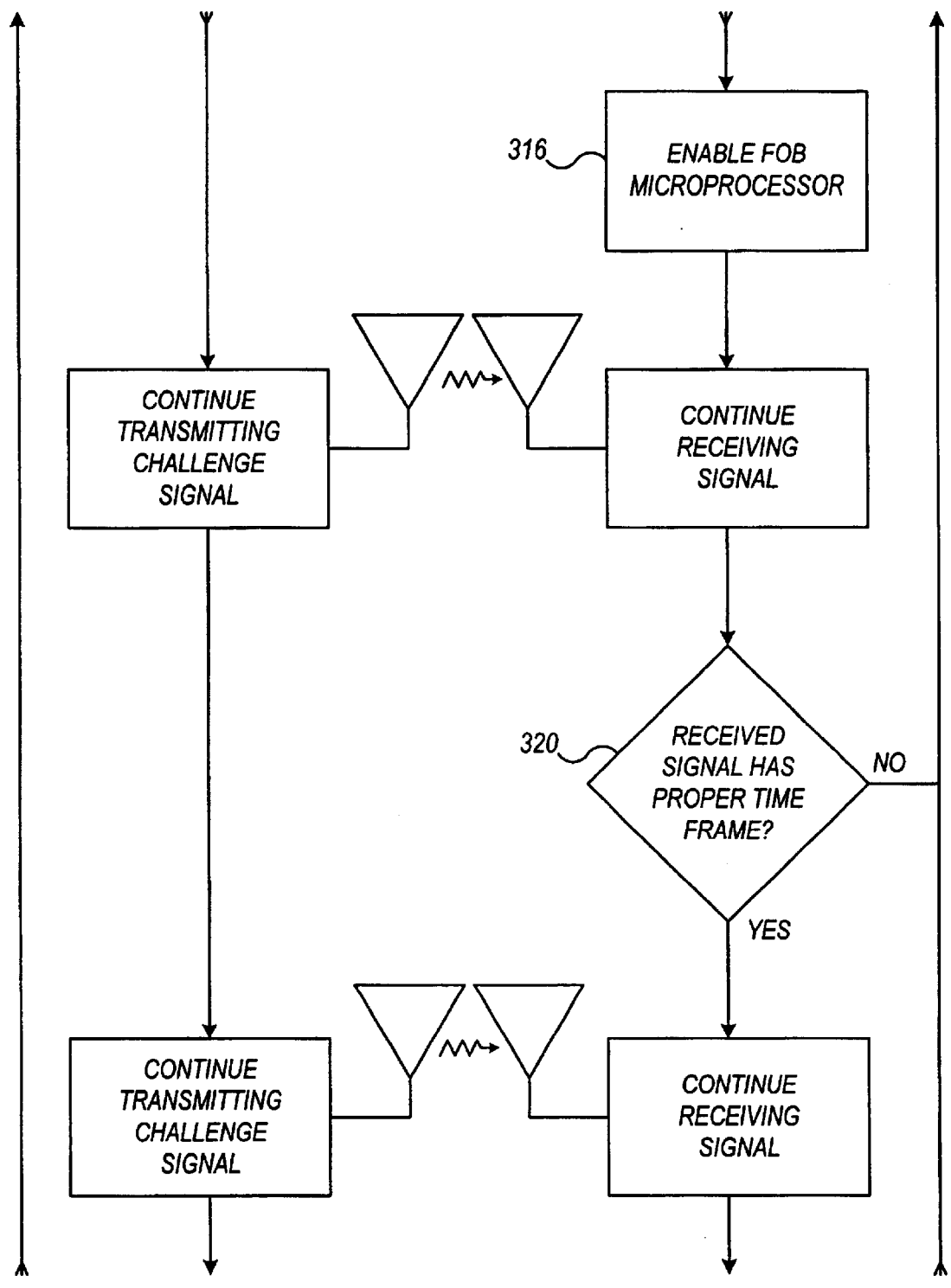
Figure 3C:
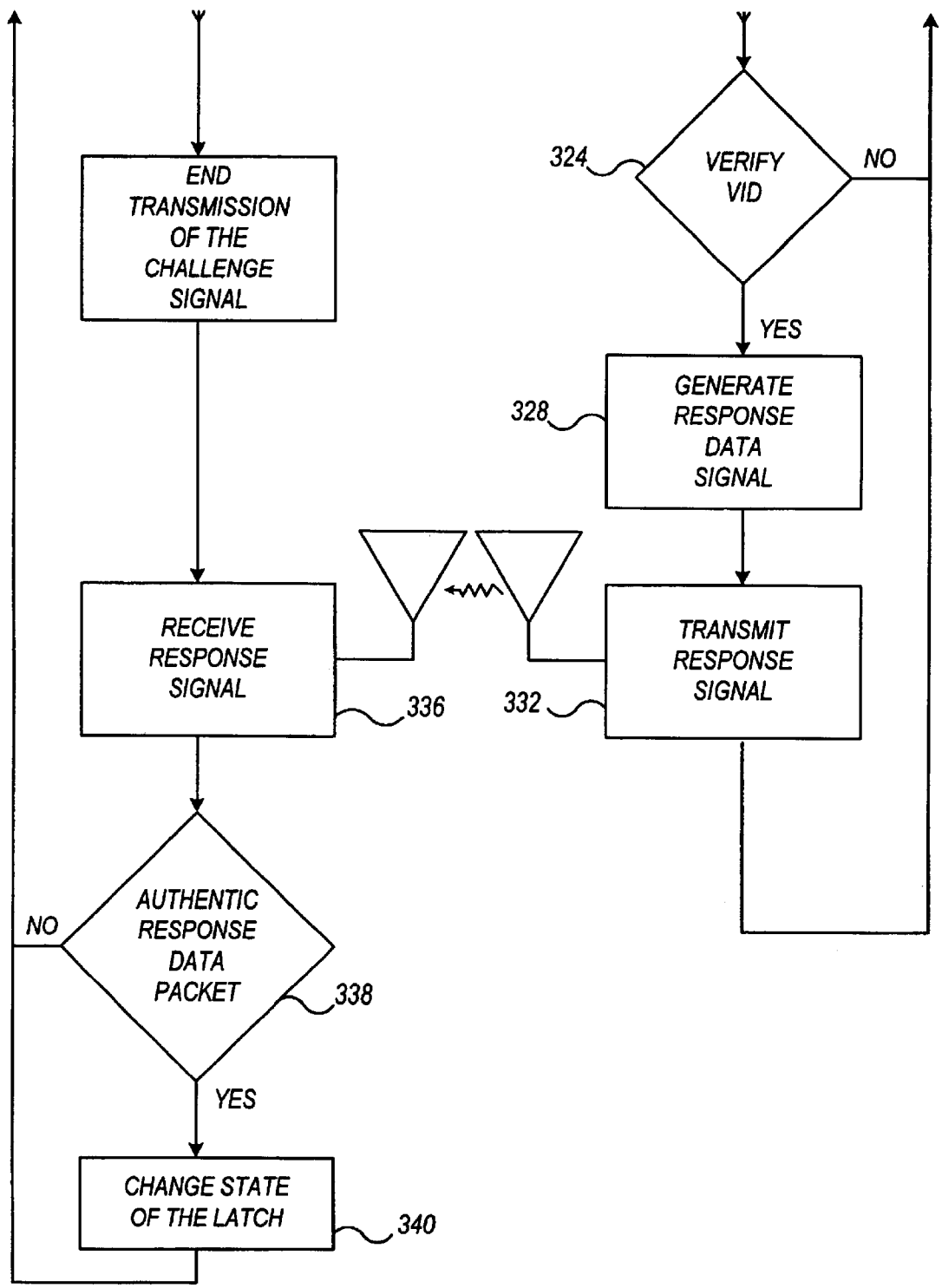

In the preferred embodiment (as shown in FIG. 3), the method of allowing entry into the vehicle specifically includes, after the user actuates the actuating device 300, the acts of generating a challenge data signal including a challenge data packet 302; transmitting the challenge data signal from the vehicle antenna 304; receiving the challenge signal at the fob antenna 308; authenticating the challenge data packet 312, 316, 320 and 324; generating a response signal having a response data packet in response to receiving the challenge signal 328; transmitting the response signal from the fob antenna 332; receiving the response signal at the vehicle antenna 336; authenticating the response data packet 338; and changing the state of the latch from the secured state to the unsecured state in response to receiving the response signal 340. The act of authenticating the challenge data packet further includes the acts of determining whether the received signal has the proper amplitude, modulation and frequency 312, enabling the fob microprocessor 316, determining whether the received signal has the proper timing (i.e., timing or bit timing) 320, and determining whether the VID number of the challenge data packet is the same as the VID number stored in the fob 324. If the data packet is not successfully authenticated, the fob microprocessor returns to the sleep mode 344.

Various features and advantages of the invention are set forth in the following claims.

What is claimed is:

1. A method of allowing entry into a vehicle including a frame and a vehicle entry system, the frame including at least one vehicle door and a respective latch mechanism, both mounted on the frame, the latch mechanism having a latch movable between a secured state preventing opening of the respective door and an unsecured state allowing opening of the respective door, and the vehicle entry system including a vehicle controller, at least one vehicle antenna associated with the vehicle door and a fob having a fob antenna, the method comprising the acts of:

generating a challenge signal including a challenge data packet;

transmitting the challenge signal from the vehicle antenna;

receiving the challenge signal at the fob antenna;

generating a response signal having a response data packet in response to receiving the challenge signal;

transmitting the response signal from the fob antenna;

receiving the response signal at the vehicle antenna;

changing the state of the latch from the secured state to the unsecured state in response to receiving the response signal;

wherein the vehicle controller includes a vehicle identification (VID) number, and wherein the act of generating a challenge signal includes the acts of:

providing a random number having digits;

providing challenge data having digits, the challenge data including the VID; and combining the challenge data with the random number to form a challenge data packet.

2. The method as set forth in claim 1 wherein the act of combining the challenge data with the random number includes the act of interspersing the digits of the challenge data with the digits of the random number.

3. A method of allowing entry into a vehicle including a frame and a vehicle entry system, the frame including at least one vehicle door and a respective latch mechanism, both mounted on the frame, the latch mechanism having a latch movable between a secured state preventing opening of the respective door and an unsecured state allowing opening of the respective door, and the vehicle entry system including a vehicle controller, at least one vehicle antenna associated with the vehicle door and a fob having a fob antenna, the method comprising the acts of:

transmitting a challenge signal including a challenge data packet from the vehicle antenna;

receiving the challenge signal at the fob antenna;

generating a response signal having a response data packet in response to receiving the challenge signal;

transmitting the response signal from the fob antenna;

receiving the response signal at the vehicle antenna;

changing the state of the latch from the secured state to the unsecured state in response to receiving the response signal; and authenticating the challenge data packet in the fob after receiving the challenge data signal and before generating the response signal.

4. The method as set forth in claim 3, wherein the vehicle controller and the fob each include a stored vehicle identification (VID) number, a stored fob identification (FID) number, and a vehicle electronic key code, wherein the challenge data packet includes the VID number, and wherein the act of authenticating includes the acts of:

separating the VID number from the challenge data packet; and determining if the VID number of the challenge data packet is the same as the stored VID number of the fob.

5. The method as set forth in claim 4, wherein the act of separating further includes the act of extracting the digits of the challenge data packet from the digits of the random number.

6. The method as set forth in claim 5, wherein the fob includes a fob electronic key code, and wherein the act of extracting the digits is performed using the key code.

7. The method as set forth in claim 3, wherein the vehicle controller contains a vehicle electronic key code, and wherein the method further comprises:

generating an initiation signal including an initiation data packet having the vehicle electronic key code;

transmitting the initiation signal from the vehicle antenna;

receiving the initiation signal at the fob antenna; and storing the vehicle electronic key code in the fob in response to receiving the initiation signal.

8. The method as set forth in claim 7 wherein the vehicle controller further contains a vehicle identification (VID) number and a fob identification (FID) number, and wherein the initiation data packet further includes the VID number and the FID number, and wherein the method includes storing the VID number and the FID number in the fob in response to receiving the initiation signal.

9. The method as set forth in claim 3, further comprising the act of authenticating the response data packet in the vehicle controller after receiving the response signal and before changing the state of the latch.

10. The method as set forth in claim 9, wherein the response data packet includes a fob identification (FID) number, wherein the vehicle controller includes a stored FID number, and wherein the act of authenticating includes the acts of:

separating the FID number from the response data packet; and determining if the FID number of the response data packet is the same as the stored FID number in the vehicle controller.

11. The method as set forth in claim 10, wherein the act of separating includes the act of extracting the digits of the response data packet from the digits of a number calculated based on the random number.

12. The method as set forth in claim 11, wherein the vehicle controller includes a vehicle electronic key code, and wherein the act of extracting is performed using the vehicle electronic key code.

13. The method as set forth in claim 9, wherein the vehicle controller and the fob each include a stored vehicle identification (VID) number, a stored fob identification (FID) number, and a vehicle electronic key code, wherein the challenge data packet includes the VID number and a random number, and wherein the act of authenticating includes the acts of:

calculating a calculated number in the fob using the random number;

calculating an expected response in the vehicle controller;

transmitting the calculated number with the response signal; and comparing the calculated number with the expected response and changing the state of the latch if the calculated number and the expected response are the same.

14. The method as set forth in claim 3, wherein the vehicle entry system includes at least a second fob having a second fob antenna, the method further comprising the acts of:

receiving the challenge signal at the second fob antenna;

generating a second response signal having a second response data packet in response to receiving the challenge signal;

transmitting the second response signal from the second fob antenna; and receiving the second response signal at the vehicle antenna.

15. The method as set forth in claim 14, wherein the act of transmitting the second response signal occurs a predetermined time period after the act of transmitting the first fob response signal.

16. The method as set forth in claim 15, wherein the act of generating the second response signal occurs a predetermined time period after the act of generating the first response signal.

17. A method of allowing entry into a vehicle including a frame and a vehicle entry system, the frame including at least one vehicle door and a respective latch mechanism, both mounted on the frame, the latch mechanism having a latch movable between a secured state preventing opening of the respective door and an unsecured state allowing opening of the respective door, and the vehicle entry system including a vehicle controller, at least one vehicle antenna associated with the vehicle door and a fob having a fob antenna, the method comprising the acts of:

transmitting a challenge signal including a challenge data packet from the vehicle antenna;

receiving the challenge signal at the fob antenna;

generating a response signal having a response data packet in response to receiving the challenge signal;

transmitting the response signal from the fob antenna;

receiving the response signal at the vehicle antenna; and changing the state of the latch from the secured state to the unsecured state in response to receiving the response signal; and wherein the fob controller includes a fob identification (FID) number, and wherein the act of generating a response signal includes the acts of:

providing a random number having digits, the random number being generated from a one of the vehicle controller and the fob;

providing a response data packet having digits, the response data packet including the FID;

generating a calculated number having digits using the random number; and combining the response data packet with the calculated number.

18. The method as set forth in claim 17 wherein the act of combining includes the act of interspersing the digits of the response data packet with the digits of the calculated number.

19. A method of allowing entry into a vehicle including a frame and a vehicle entry system, the frame including at least one vehicle door and a respective latch mechanism, both mounted on the frame, the latch mechanism having a latch movable between a secured state preventing opening of the respective door and an unsecured state allowing opening of the respective door, and the vehicle entry system including a vehicle controller having at least one vehicle antenna associated with the vehicle door, a vehicle identification (VID) number, and at least one stored fob identification (FID) number, and a fob having a fob antenna, a FID number, and a stored VID number, the method comprising the acts of:

generating a challenge signal including a challenge data packet having the VID number;

transmitting the challenge signal from the vehicle antenna;

receiving the challenge signal at the fob antenna;

authenticating the challenge data packet in the fob in response to receiving the challenge signal, the act of authenticating includes the act of determining if the VID number of the challenge data packet is the same as the stored VID number of the fob;

generating a response signal including a response data packet having the FID number if the challenge data packet has been authenticated;

transmitting the response signal from the fob antenna;

receiving the response signal at the vehicle antenna;

authenticating the response data packet in the vehicle controller in response to the response signal, the authenticating act including the act of determining if the FID number of the response data packet is the same as the stored FID number of the vehicle controller; and changing the state of the latch from the secured state to the unsecured state if the act of authenticating the response data packet has been met.

20. A method of allowing entry into a vehicle including a frame and a vehicle entry system, the frame including at least one vehicle door and a respective latch mechanism, both mounted on the frame, the latch mechanism having a latch movable between a secured state preventing opening of the respective door and an unsecured state allowing opening of the respective door, and the vehicle entry system including a vehicle controller, at least one vehicle antenna associated with the vehicle door and a fob having a fob antenna, the method comprising the acts of:

providing a microprocessor in the fob, the microprocessor having a sleep mode wherein power consumption by the microprocessor is low, and an operating mode wherein power consumption by the microprocessor is higher than in the sleep mode;

providing a challenge signal having a challenge data packet to the fob;

authenticating the challenge signal by successively applying a series of criteria to the challenge signal; and determining whether to bring the microprocessor out of the sleep mode.

21. The method as set forth in claim 20 wherein the act of successively applying a series of criteria to the challenge signal includes the acts of:

determining if the challenge signal at the fob has a proper signal amplitude;

if the challenge signal has a proper signal amplitude, determining if the challenge signal at the fob has a proper timing; and if the challenge signal has a proper timing, validating the challenge data packet in the fob in response to the challenge signal.

22. The method as set forth in claim 21, and further comprising the act of bringing the microprocessor out of the sleep into the operating mode after the act of determining that the challenge signal has the proper signal amplitude.

23. The method as set forth in claim 22, and further comprising the act of returning the microprocessor to the sleep mode if the challenge signal does not have the proper timing or if the challenge data packet is not correctly validated during the act of validating the challenge data packet.

24. The method as set forth in claim 20, wherein the act of providing a challenge signal further comprises the acts of:

generating the challenge signal having the challenge data packet;

transmitting the challenge signal from the vehicle antenna; and receiving the challenge signal at the fob antenna.

25. The method as set forth in claim 24, and further comprising the acts of:

generating a response signal including a response data packet;

transmitting the response signal from the fob antenna;

receiving the response signal at the vehicle antenna;

validating the response data packet in the vehicle controller in response to receiving the response signal; and changing the state of the latch from the secured state to the unsecured state if the act of authenticating the response data packet has been met.

26. The method as set forth in claim 25, wherein the response data packet includes a fob identification (FID) number, wherein the vehicle controller includes a stored FID number, and wherein the act of validating the response data packet includes the acts of:

extracting the FID number from the response data packet; and determining if the FID number of the response data packet is the same as the stored FID number.

27. The method as set forth in claim 25, wherein the vehicle controller and the fob each include a stored vehicle identification (VID) number, a stored fob identification (FID) number, and a vehicle electronic key code, wherein the challenge data packet includes the VID number and a random number, and wherein the act of validating includes the acts of:

calculating an answer in the fob using the random number;

calculating an expected response in the vehicle controller;

transmitting the answer with the response signal; and comparing the answer with the expected response and changing the state of the latch if the answer and the expected response are the same.

* * * * *